United States Patent Office 3,463,859
Patented Aug. 26, 1969

3,463,859
METHOD OF PROTECTING PLANTS WITH SULFUROUS ACID ORGANIC ESTERS
Rupert A. Covey, Wolcott, Allen E. Smith, Bethany, and Winchester L. Hubbard, Woodbridge, Conn., assignors to Uniroyal, Inc., a corporation of New Jersey
No Drawing. Original application July 18, 1963, Ser. No. 296,107, now Patent No. 3,272,854. Divided and this application Mar. 23, 1966, Ser. No. 536,621
Int. Cl. A01n 9/14, 5/00; C07c 143/28
U.S. Cl. 424—303                6 Claims

ABSTRACT OF THE DISCLOSURE

Plants are protected against attack by insects by treating the plants with a composition having the formula

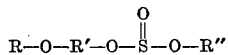

in which R and R″ are selected from the group consisting of aliphatic and aromatic radicals and R′ is a divalent cycloaliphatic radical in which the two valences are on different carbon atoms.

This application is a division of copending U.S. application 296,107, filed July 18, 1963, now Patent No. 3,272,854.

---

This invention relates to new chemicals, namely new organic esters of sulfurous acid, more particularly to mixed sulfite diesters of aliphatic or aromatic monohydroxy compounds and glycol ethers.

The new compounds of the present invention are useful as insecticides, particularly for the control of mites. They may also be used as plasticizers.

The chemicals of the invention may be represented by the formula

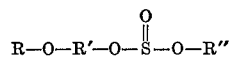

in which R is an aliphatic radical, e.g. alkyl, alkenyl, alkynyl, cycloalkyl, alkoxycycloalkyl, haloalkyl, cyanoalkyl, alkoxyalkyl, or aryloxyalkyl, or R is an aromatic radical, e.g., phenyl or naphthyl, or a phenyl or naphthyl (aryl) radical having one or more substituents in the aryl nucleus selected from the group consisting of alkyl, cycloalkyl, haloalkyl, alkoxy, halo and nitro; R″ is an aliphatic radical, e.g. alkyl, alkenyl, alkynyl, cycloalkyl, alkoxycycloalkyl, haloalkyl, cyanoalkyl, alkoxyalkyl, aryloxyalkyl or carbalkoxyalkyl, or R″ is an aromatic radical, e.g., phenyl or naphthyl, or a phenyl or naphthyl (aryl) radical having one or more substituents in the aryl nucleus selected from the group consisting of alkyl, cycloalkyl, haloalkyl, alkoxy and halo; and R′ is a divalent cycloaliphatic radical in which the two valences are on two different carbon atoms, e.g. cycloalkylene, alkyl substituted cycloalkylene or alkenyl substituted cycloalkylene. The aliphatic and aromatic radicals R and R″ will generally have not more than 18 carbon atoms each and the cycloaliphatic radical R′ will generally have 4 to 8 carbon atoms in the cycloalkylene nucleus and contain not more than 12 carbon atoms. In the formulae and reactions referred to below, R, R′ and R″ are the same as in the above general formula.

Examples of R and R″ are methyl, ethyl, propyl, isopropyl, butyl, isobutyl, sec.-butyl, tert.-butyl, amyl, hexyl, 2-ethylhexyl, octyl, decyl, isodecyl, dodecyl, hexadecyl, octadecyl; allyl, methallyl; alkynyl radicals having 3 to 10 carbon atoms, e.g., propargyl and 1-(3-nonynyl), cyclohexyl, 4-methoxycyclohexyl, 3-p-toloxycyclohexyl, 2-chloroethyl, 2,2,2-trichloroethyl, γ-chloropropyl, 2,4-dichlorobutyl, ω-trichloroamyl, 2-cyanoethyl, methoxyethyl, sec.-butoxyisopropyl, o-toloxyethyl, phenyl, 1-naphthyl, 2-naphthyl, p-tolyl, o-tolyl, 2-methyl-4-t-butylphenyl, isopropylphenyl, tert.-butylphenyl, tert.-amylphenyl, nonylphenyl, cyclohexylphenyl, chloromethylphenyl, methoxyphenyl, bromophenyl, 2-chlorophenyl, 2,4-dichlorophenyl, trichlorophenyl, pentachlorophenyl. An additional example of R is nitrophenyl. An additional example of R″ is carbethoxymethyl. Examples of R′ are 1,2- cyclohexylene, 1,3-cyclohexylene, 1,4-cyclohexylene, 2,2,4,4-tetramethyl - 1,3 - cyclobutylene, methyl cyclohexylenes, vinylcyclohexylenes, 1,2-cyclooctylene, 1,2-cyclopentylene.

The compounds of the present invention may be prepared by reacting the selected aliphatic or aromatic monohydroxy compound having the formula R″OH with the separately prepared chlorosulfinate of the selected glycol ether having the formula R—O—R′—OH as illustrated in the following reaction and in Example 1 below.

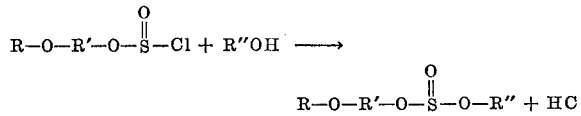

The chlorosulfinates

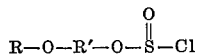

are prepared by reacting the selected glycol ether

R—O—R′—OH with thionyl chloride, as illustrated in the following reaction and in Example 1 below.

The glycol ethers R—O—R′—OH which contain cycloalkylene groups having the two valences in 1,2-relationship may be prepared by reacting the hydroxy compound having the formula ROH with a 1,2-epoxycycloalkane or alkyl or alkenyl substituted 1,2-epoxycycloalkane, as illustrated in the following reaction and in Examples 1, 2 and 3 below:

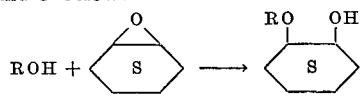

The glycol ethers R—O—R′—OH which contain cycloalkylene groups having the two valences in 1,2- or 1,3- or 1,4-relationship may be prepared by reacting an alkalimetal salt of the aliphatic or aromatic hydroxy compound ROH with a chlorocycloalkanol, as illustrated in the following reaction and in Example 4 below:

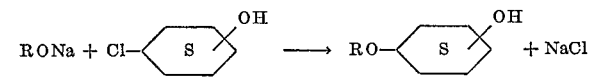

The compounds of the present invention may also be prepared by reacting the selected glycol ether having the formula R—O—R′—OH with the separately prepared chlorosulfinate of the monohydroxy compound R″OH where the R″ is alkyl, cycloalkyl, alkoxycycloalkyl, haloalkyl, cyanoalkyl, alkoxyalkyl, aryloxyalkyl or carbalkoxyalkyl, as illustrated in the following reaction and in Examples 2 and 3 below.

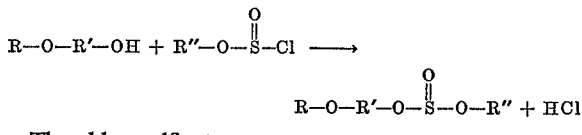

The chlorosulfinates

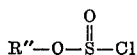

are prepared in known manner by reacting the selected alcohol R″OH with thionyl chloride, as illustrated in the following reaction and in Examples 2 and 3 below.

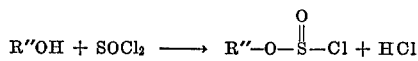

The preparation of the chlorosulfinates of the glycol ethers and the chlorosulfinates of the alcohols as described above is carried out at a temperature of between −5° C. and 60° C. and the yield of chlorosulfinate is nearly quantitative. An inert solvent such as benzene, xylene or solvent naphtha may be used.

The preparation of the sulfite esters is carried out in the presence of an HCl acceptor, such as pyridine, dimethylaniline or trimethylamine, and in a solvent such as benzene, xylene or solvent naphtha. The reaction temperature is generally between −10° C. and 50° C., preferably near 0° C.

Examples of sulfite diesters of the present invention are:

Allyl 2-methoxycyclohexyl sulfite
Phenyl 2-ethoxycyclohexyl sulfite
2-ethylhexyl 2-butoxycyclohexyl sulfite
m-(n-Propyl)phenyl 2-tert.-butoxycyclohexyl sulfite,
Cyclohexyl 2-(2-ethylhexoxy)cyclohexyl sulfite
Propargyl 2-hexadecoxycyclohexyl sulfite
p-t-Amylphenyl 2-allyloxycyclohexyl sulfite
Ethyl 2-propargyloxycyclohexyl sulfite
γ-Chlorobutyl 2-cyclohexoxycyclohexyl sulfite
Propargyl 2-(2-chloroethoxy)cyclohexyl sulfite
Butyl 2-(γ-chlorobutoxy)cyclohexyl sulfite
Hexadecyl 2-(2-cyanoethoxy)cyclohexyl sulfite
p-Chloromethylphenyl 2-(methoxyethoxy)cyclohexyl sulfite
Carbethoxymethyl 2-phenoxycyclohexyl sulfite
Propargyl 2-(o-toloxy)cyclohexyl sulfite
Methyl 2-(m-n-propylphenoxy)cyclohexyl sulfite
p-Methoxyphenyl 2-(p-isopropylphenoxy)cyclohexyl sulfite
Propargyl 2-(p-tert.-amylphenoxy)cyclohexyl sulfite
2-cyanoethyl 2-(2-cyclohexylphenoxy)cyclohexyl sulfite
p-Isopropylphenyl 2-(p-chloromethylphenoxy)cyclohexyl sulfite
2-chloroethyl 2-(p-methoxyphenoxy)cyclohexyl sulfite
tert.-Butyl 2-(p-tert.-butylphenoxy)cyclohexyl sulfite
o-Tolyl 2-(2-chlorophenoxy)cyclohexyl sulfite
2-methoxyethyl 2-(1-naphthoxy)cyclohexyl sulfite
2-cyclohexylphenyl 2-(m-nitrophenoxy)cyclohexyl sulfite
2-chlorophenyl 2-(p-tert.-butylphenoxy)cyclohexyl sulfite
1-naphthyl 2-(p-tert.-butylphenoxy)cyclohexyl sulfite
Propargyl 3-(p-tert.-butylphenoxy)cyclohexyl sulfite
Propargyl 4-(p-tert.-butylphenoxy)cyclohexyl sulfite
Propargyl 3-(p-tert.butylphenoxy)-2,2,4,4-tetramethylcyclobutyl sulfite
Propargyl 2-(tert.-butylphenoxy)-4-(or 5-)vinylcyclohexyl sulfite
Propargyl 2-(p-tert.-butylphenoxy)cyclooctyl sulfite
2-chloroethyl 4-methoxycyclohexyl sulfite
o-Tolyl 3-(2-chloroethoxy)-2,2,4,4-tetramethylcyclobutyl sulfite
Carbethoxymethyl 5-(allyloxy)cyclooctyl sulfite
Propargyl 2-(4-methoxycyclohexoxy)cyclohexyl sulfite
Propargyl 2-(o-toloxyethoxy)cyclopentyl sulfite Examples 1 to 4 illustrate the preparation of the compounds of the present invention. All parts and percentages referred to herein are by weight.

Example 1.—Preparation of propargyl 2-(p-tert.-butylphenoxy)cyclohexyl sulfite

The 2-(p-tert.-butylphenoxy)cyclohexanol was made as follows: p-tert.-Butylphenol (711 g., 4.74 moles) and 10.6 g. sodium hydroxide were combined and heated to 150° C. Cyclohexene oxide, i.e. 1,2-epoxycyclohexane (465 g., 4.74 moles) was added dropwise during 1 hr., maintaining the reaction temperature at 150–160° C. After the addition was completed, the mixture was stirred at this temperaure for 30 min. Xylene (500 ml.) was added and the mixture was cooled to 100° C. and neutralized with 12.8 g. concentrated sulfuric acid. Some of the xylene was distilled off in order to azeotrope out the water formed in the neutralization. The resulting xylene solution of the product is suitable for use in making the chlorosulfinate.

An aliquot of this solution was heated under reduced pressure to remove the xylene and other volatiles. Analysis of the residue showed that the product was obtained in 98.3% yield. The product can be recrystallized from hexane and melts 93–95° C.

The 2-(p-tert.-butylphenoxy)cyclohexyl chlorosulfinate was prepared as follows: The xylene solution of 2-(p-tert.-butylphenoxy)cyclohexanol (1,653 g. of solution containing 1,025 g., 4.13 moles) was warmed to 60° C. whereupon a clear solution was obtained. Thionyl chloride (540 g., 4.54 moles) was added during 30 min. with enough cooling to cause the temperature to drop continuously. The mixture was allowed to stir at 5–10° C. for 2.5 hours and then stored at room temperature for 15 hours. The volatile materials were removed by warming the mixture to 40° C. (5 mm.) to obtain 2-(p-tert.-butylphenoxy)cyclohexyl chlorosulfinate.

Propargyl alcohol (254 g., 4.54 moles), 326 g. (4.13 moles) pyridine and 250 ml. xylene were combined and the solution was cooled to 0–5° C. The chlorosulfinate was added during 1 hr. keeping the reaction temperature between 5 and 15° C. The mixture was stirred for 30 min. and was washed with 2 l. water. The aqueous layer was extracted with ether and the ether layer combined with the product. The crude product was washed with 1.1 saturated salt solution. The solvents were removed and the residue heated to 90° C. (0.3 mm.). Yield, 1,348 g. (93.3%).

*Analysis.*—Calculated for $C_{19}H_{26}O_4S$: S, 9.15%. Found: S, 8.57%.

Sulfur analyses of other chemicals of the present invention made by the method illustrated in this example were:

Propargyl 2-(o-toloxy)cyclohexyl sulfite. Calculated S, 10.40%. Found: 9.92%, 9.48%.

o-Tolyl 2-(o-toloxy)cyclohexyl sulfite. Calculated S, 8.89%. Found: 8.27%, 8.13%.

Carbethoxymethyl 2-(p-toloxy)cyclohexyl sulfite. Calculated S, 8.99%. Found: 8.14%.

o-Tolyl 2-(p-tert.-butylphenoxy)cyclohexyl sulfite. Calculated S, 7.97%. Found: 7.26%, 7.28%.

Ethyl 2-(p-tert.-butylphenoxy)cyclohexyl sulfite. Calculated S, 9.42%. Found: 7.75%.

Propargyl 2-(p-tert.-butylphenoxy)-4-(or 5-) vinylcyclohexyl sulfite. Calculated S, 8.25%. Found: 7.43%, 7.57%.

o-Tolyl 2-(p-tert.-butylphenoxy)-4-(or 5-) vinylcyclohexyl sulfite. Calculated S, 7.11%. Found: 7.21%, 6.98%.

Propargyl 2-(p-tert.-butylphenoxy)cyclopentyl sulfite. Calculated S, 9.47%. Found: 8.64, 8.97%.

o-Tolyl 2-(p-tert.-butylphenoxy)cyclopentyl sulfite. Calculated S, 8.28%. Found: 7.65%, 7.66%.

Example 2.—Preparation of 2-chloroethyl 2-(o-toloxy) cyclohexyl sulfite

The 2-(o-toloxy)cyclohexanol was made as follows: o-Cresol (31.6 ml., 32.4 g., 0.3 mole) and 0.3 g. sodium hydroxide were combined and heated to 150–160° C. Cyclohexene oxide (29.4 g., 0.3 mole) was added dropwise during 30 min., maintaining this temperature. The mixture was then heated for 30 min. at 160–175° C. and was allowed to cool to room temperature. Concentrated sulfuric acid (0.3 ml.) was added to neutralize the solution and the product was distilled; B.P. 107–115° C. (0.4 mm.). Yield, 39.5 g. (64%).

2-(o-toloxy)cyclohexanol (7.3 g., 0.035 mole), 3.1 ml. (3.1 g., 0.039 mole) pyridine and 20 ml. xylene were combined and the solution cooled to 0–5° C. A solution of 6.4 g. (0.039 mole) 2-chloroethyl chlorosulfinate, prepared by a known procedure as shown in U.S. Patent No. 2,820,808, Ex. I, in 10 ml. xylene was added dropwise with stirring during 15 min. keeping the reaction temperature below 15° C. The mixture was stirred for 15 min. after the addition and was then washed twice with 25 ml. water, once with 25 ml. 2 N NaOH, and three more times with water, until the washings were neutral to pH paper. The xylene was removed, the product was heated to 85° C. (0.15 mm.) and filtered through Dicalite (filteraid). Yield 11.2 g. (95.7%).

*Analysis.*—Calculated for $C_{15}H_{21}O_4SCl$: S, 9.63%. Found: S, 9.71%, 9.56%.

Example 3.—Preparation of 2-methoxyethyl 2-methoxycyclohexyl sulfite

The 2-methoxycyclohexanol was prepared as follows: Methanol (24.2 ml., 19.2 g., 0.6 mole) and 0.2 g. sodium hydroxide were combined and the mixture heated to reflux. Cyclohexene oxide (29.4 g., 0.3 mole) was added dropwise during 0.5 hour. The mixture was refluxed for 14 hrs. and the excess methanol was distilled off. Concentrated sulfuric acid (0.2 ml.) was added to neutralize the sodium hydroxide and the mixture was distilled; B.P. 69–73° C. (9 mm.), yield 28.7 g. (73.5%).

The 2-methoxyethyl chlorosulfinate was prepared as follows: Thionyl chloride (80.0 ml., 131 g., 1.1 moles) was added dropwise during 0.5 hour to 78.8 ml. (76.0 g., 1 mole) methyl Cellosolve previously cooled to 0–5° C. The temperature during the addition was maintained below 10° C. The reaction mixture was allowed to warm to room temperature and stand for 15 hrs. The excess thionyl chloride was removed under reduced pressure and the product distilled; B.P. 85° C. (20 mm.), yield 144.5 g. (91.2%).

2-methoxycyclohexanol (6.5 g., 0.05 mole), 4.5 ml. (4.4 g., 0.055 mole) pyridine and 40 ml. xylene were combined and the solution cooled to 0° C. A solution of 8.7 g. (0.055 mole) 2-methoxyethyl chlorosulfinate in 10 ml. xylene was added during 15 min., keeping the temperature below 10° C. The mixture was stirred for two hours and then washed once with 50 ml. water and twice with 25 ml. saturated salt solution. The xylene was removed under reduced pressure and the residue distilled; B.P. 115–118° C. (0.7 mm.). Yield, 10.3 g. (81.8%).

*Analysis.*—Calculated for $C_{10}H_{20}O_5S$: S, 12.70%. Found: S, 12.44%, 11.92%.

Sulfur analysis of 2-chloroethyl 2-(p-tert.-butylphenoxy)cyclohexyl sulfite made by the method illustrated in Examples 2 and 3 was as follows: Calculated S, 8.55%. Found: 8.21%, 8.37%.

Example 4

The following illustrates the preparation of the 2-(p-tert.-butylphenoxy)cyclohexanol intermediate of Example 1 by reacting an alkali metal salt of p-tert.-butylphenol with 2-chlorocyclohexanol. The 2-(p-tert.-butylphenoxy) cyclohexanol so prepared may be reacted as in Example 1 with thionyl chloride to form the 2-(p-tert.-butylphenoxy) cyclohexyl chlorosulfinate which may be reacted with propargyl alcohol to form the propargyl 2-(p-tert.-butylphenoxy)cyclohexyl sulfite.

The 2-chlorocyclohexanol was prepared as follows: To 62.5 ml. (0.75 mole) concentrated hydrochloric acid was added 49.1 g. (0.5 mole) cyclohexene oxide with stirring during 50 min., keeping the reaction temperature mainly below 10° C. The mixture was cooled to 0° C. and stirred for 40 min. During this time the reaction mixture partially solidified. The mixture was poured over 34.5 g. (0.25 mole) solid potassium carbonate. Ether was added and the two layers were separated. The aqueous layer was washed twice with ether. The ether layers were combined and dried over anhydrous potassium carbonate. The ether was removed and the residue distilled; B.P. 108–115° C. (50 mm.). Yield, 42.7 g. (63.3%).

The 2-(p-tert.-butylphenoxy)cyclohexanol was prepared as follows: p-tert.-Butylphenol (25 g., 0.165 mole), 7.2 g. (0.18 mole) sodium hydroxide, and 115 ml. ethanol were combined and the mixture heated to reflux. A solution of 20.1 g. (0.15 mole) 2-chlorocyclohexanol in 25 ml. ethanol was added during 35 min. Sodium chloride started to precipitate immediately. The mixture was refluxed for 6 hrs. and then filtered. The sodium chloride obtained was washed with a small amount of ethanol and dried; wt. 8.5 g. (97% of the theoretical). Removal of the solvent and volatile materials from the filtrate yielded 26.7 g. of a crude product containing some p-tert.-butylphenol. Recrystallization from hexane afforded a pure product, melting 92–95.5° C. A mixed melting-point of this material with 2-(p-tert.-butylphenoxy)cyclohexanol prepared from cyclohexene oxide in Example 1 showed no depression.

EXAMPLE 5

This example illustrates the effectiveness of the chemicals of the present invention for controlling mites.

Pinto beans in the two-leaf stage and grown in 4″ baskets under greenhouse conditions at 70° F.–75° F. were used. Three plants for a total of six leaves were in each basket for each test. The tests on the chemicals and checks were replicated once. Aqueous suspensions of the chemicals were prepared by adding to 0.2 gram of the chemical one drop (0.03 gram) of a commercial surfaceactive dispersing agent (isooctylphenyl polyethoxy ethanol) and 1 ml. of acetone, washing into 200 ml. of water, agitating to form a dispersion and diluting with water to the desired concentrations of 1000 p.p.m. and 200 p.p.m.

The plants were sprayed with the dispersions of the chemicals at the various concentrations and the check plants were sprayed with aqueous solutions containing surface-active agent and acetone without the chemicals. The sprayings thoroughly wet the upper surface of the leaves. The plants were returned to the greenhouse. The following day (20–24 hours later), rings of an adhesive preparation non-toxic to the organisms under test, such as is used on fly papers and for ringing trees, were placed around the borders of the upper surfaces of the leaves to restrict the mites to the upper leaf surface. Mites were transferred to the thus treated leaves by placing bean leaflets heavily infested with two-spotted adult mites, *Tetranychus telarius* L. within the border of the adhesive preparation on the leaves of the plants under test. A count of the number of mites transferred was made the same day. The counts ranged from 30 to 300 mites on the six leaves. The plants were kept in the greenhouse for another four days. A final count of the number of living mites remaining on the leaves was then made. The percent control is found by using the formula:

$$\% \text{ Control} = 100\left(1 - \frac{\text{Final count living mites}}{\text{Original count}}\right)$$

The control of mites by the chemicals of the present invention at the various concentrations is shown in the following table (the check treatments without the chemicals had about 20% mortality):

| Chemicals | Percent control at— | |
| --- | --- | --- |
| | 1,000 p.p.m. | 200 p.p.m. |
| Propargyl 2-(o-toloxy)cyclohexyl sulfite | 100 | 90 |
| o-Tolyl 2-(o-toloxy)cyclohexyl sulfite | 99 | 86 |
| 2-chloroethyl 2-(o-toloxy) cyclohexyl sulfite | 100 | 89 |
| Carbethoxymethyl 2-(p-toloxy)cyclohexyl sulfite | 57 | 58 |
| Propargyl 2-(p-tert.-butylphenoxy)cyclohexyl sulfite | 100 | 100 |
| o-Tolyl 2-(p-tert.-butylphenoxy)cyclohexyl sulfite | 98 | 93 |
| 2-chloroethyl 2-(p-tert.-butylphenoxy)cyclohexyl sulfite | 100 | 100 |
| Propargyl 2-(p-tert.-butylphenoxy)-4-(or 5-)vinyl cyclohexyl sulfite | 97 | 57 |
| o-Tolyl 2-(p-tert.-butylphenoxy)-4-(or 5-)vinyl-cyclohexyl sulfite | 61 | 43 |
| Propargyl 2-(p-tert.-butylphenoxy)cyclopentyl sulfite | 100 | 84 |
| o-Toloxy 2-(p-tert.-butylphenoxy)cyclopentyl sulfite | 73 | 30 |

The chemicals of the present invention may be applied in various manners for the control of insects. They may be applied to loci to be protected against insects as dusts when admixed with or adsorbed on powdered solid carriers, such as the various mineral silicates, e.g., mica, talc, pyrophillite and clays, or as liquids or sprays when in a liquid carrier, as in solution in a suitable solvent, such as acetone, benzene or kerosene, or dispersed in a suitable non-solvent medium, for example, water. In protecting plants (the term including plant parts) which are subject to attack by insects, the chemicals of the present invention are preferably applied as aqueous emulsions containing a surface-active dispersing agent, which may be an anionic, non-ionic or cationic surface-active agent. Such surface-active agents are well known and reference is made to U.S. Patent No. 2,547,724, columns 3 and 4 for detailed examples of the same. The chemicals of the invention may be mixed with such surface-active dispersing agents, with or without an organic solvent as insecticidal concentrates for subsequent addition of water to make aqueous suspensions of the chemicals of the desired concentration. The chemicals of the invention may be admixed with powdered solid carriers, such as mineral silicates, together with a surface-active dispersing agent so that a wettable powder may be obtained, which may be applied directly to loci to be protected against insects, or which may be shaken up with water to form a suspension of the chemical (and powdered solid carrier) in water for application in that form. The chemicals of the present invention may be applied to loci to be protected against insects by the aerosol method. Solutions for the aerosol treatment may be prepared by dissolving the chemical directly in the aerosol carrier which is liquid under pressure but which is a gas at ordinary temperature (e.g., 20° C.) and atmospheric pressure, or the aerosol solution may be prepared by first dissolving the chemical in a less volatile solvent and then admixing such solution with the highly volatile liquid aerosol carrier. The chemicals may be used admixed with carriers that are active of themselves, for example, other insecticides, fungicides, or bactericides.

Having thus described our invention, what we claim and desire to protect by Letters Patent is:

1. The method of protecting plants against attack by insects which comprises applying to the plants a compound represented by the formula

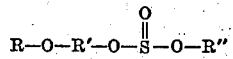

2. The method of claim 1 wherein R is p-tert.-butylphenyl, R' is cyclohexylene, and R'' is propargyl.

3. The method of claim 1 wherein R is o-tolyl, R' is cyclohexylene, and R'' is propargyl.

4. The method of claim 1 wherein R is o-tolyl, R' is cyclohexylene, and R'' is 2-chloroethyl.

5. The method of claim 1 wherein R is p-tert.-butyl phenyl, R' is cyclohexylene, and R'' is 2-chloroethyl.

6. The method of claim 1 wherein R is p-tert.-butylphenyl, R' is cyclopentylene, and R'' is propargyl.

References Cited

UNITED STATES PATENTS

| 2,820,808 | 1/1958 | Harris et al. | 260—456 |
| 2,901,338 | 8/1959 | Richter | 260—456 XR |

FRANK CACCIAPAGLIA, Primary Examiner

U.S. Cl. X.R.

260—456

PO-1050
(5/69)

UNITED STATES PATENT OFFICE
CERTIFICATE OF CORRECTION

Patent No. 3,463,859      Dated August 26, 1969

Inventor(s) Rupert A. Covey, Allen E. Smith & Winchester L. Hubl

It is certified that error appears in the above-identified patent and that said Letters Patent are hereby corrected as shown below:

Column 8, after the formula on line 25, insert -- in which R has not more than 18 carbon atoms and is selected from the grou consisting of alkyl, alkenyl, alkynyl having from 3 to 10 carbc atoms, cycloalkyl, alkoxycycloalkyl, chloroalkyl, bromoalkyl, cyanoalkyl, phenyl, naphthyl, phenyl and naphthyl having substi tuents selected from the group consisting of alkyl, cycloalkyl, chloroalkyl, bromoalkyl, alkoxy, chloro, bromo and nitro; R" ha not more than 18 carbon atoms and is selected from the group consisting of alkyl, alkenyl, alkynyl having from 3 to 10 carbc atoms, cycloalkyl, alkoxycycloalkyl, chloroalkyl, bromoalkyl, cyanoalkyl, alkoxyalkyl, carbalkoxyalkyl, phenyl, naphthyl, phenyl and naphthyl having substituents selected from the group consisting of alkyl, cycloalkyl, chloroalkyl, bromoalkyl, alkox chloro and bromo; and R' has not more than 12 carbon atoms is a divalent cycloaliphatic radical having from 4 to 8 ring carbons in which the two valences are on two different carbon atoms selected from the group consisting of cycloalkylene, alkyl substituted cycloalkylene and alkenyl substituted cycloalkylene.--

SIGNED AND
SEALED
MAY 5 1970

(SEAL)
Attest:

Edward M. Fletcher, Jr.
Attesting Officer

WILLIAM E. SCHUYLER, JR.
Commissioner of Patents